June 8, 1943.                A. WRIGHT                2,320,994
SPOON FOR CITROUS FRUITS
Filed Aug. 30, 1941
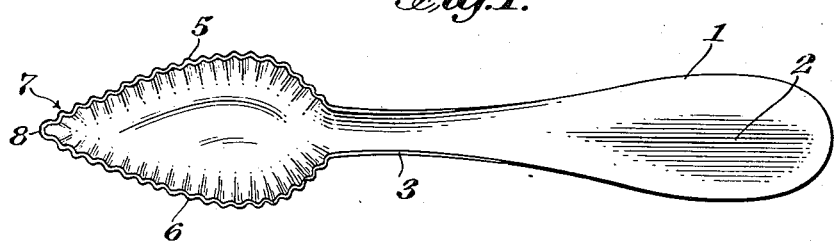
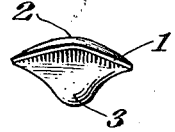           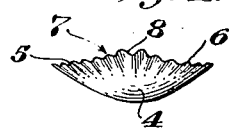
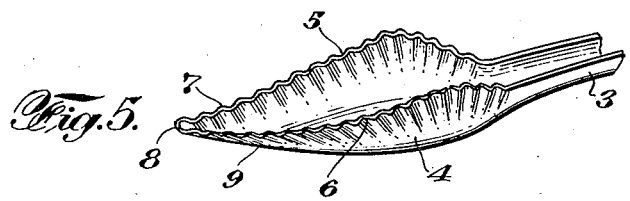
INVENTOR
Arthur Wright Patented June 8, 1943

2,320,994

UNITED STATES PATENT OFFICE 2,320,994

SPOON FOR CITROUS FRUITS

Arthur Wright, Forest Hills, N. Y.

Application August 30, 1941, Serial No. 408,941

5 Claims. (Cl. 30—324)

My invention relates particularly to a spoon to be used for citrous fruits, particularly grapefruit, but which may have application for other purposes.

The object of my invention is to provide a spoon of the above character. More particularly, the object of my invention is to provide a spoon with which to eat grapefruit without the necessity of cutting the segments of the grapefruit with a knife beforehand, as has hitherto been customary. The difficulty and annoyance involved in the cutting of grapefruit before being served is well known, in fact so much so that special utensils have been provided for the cutting of the same, which require frequent sharpening, and even then did not eliminate the time involved in the cutting of the grapefruit before being served. The spoon made in accordance with my invention is of such a character that the grapefruit need not be cut beforehand but may be served uncut and eaten at the table with said spoon, which readily cuts around the segments of the grapefruit at the same time when the meat of the grapefruit is being removed therefrom in each individual segment of the same. The spoon is so constructed that no sharp cutting edge is needed or present and, accordingly, any danger of cutting the lips is entirely absent in the use of the spoon. Further objects of my invention will appear from the detailed description of the same hereinafter, one of which objects is to provide a dull margin for the spoon which is wavy in side elevation, thus preventing any abrasion of the lips when inserting and withdrawing the spoon into and from the mouth. It cuts the fruit but will not cut the lips.

While my invention is capable of embodiment in many different forms, for the purpose of illustration I have shown only one form thereof in the accompanying drawing, in which—

Fig. 1 is a plan view of a spoon made in accordance with my invention;

Fig. 2 is a side elevation of the same;

Fig. 3 is an end elevation of the spoon;

Fig. 4 is also an end elevation of the other end of the spoon; and

Fig. 5 is a perspective view of the bowl of the spoon.

Referring to the drawing, I have shown a spoon which may be stamped out of sheet metal or molded from any desired plastic or made in any other desired way. The spoon, as shown in the drawing, is in the form made from stamped sheet metal. In this instance the spoon has a handle 1 bowed upwardly into a central ridge 2 for stiffening purposes, and adjacent to the ridge 2 there is a channel portion 3 leading to a V-shaped bowl 4 of the spoon which has, in plan view, substantially the shape of a stone arrow head, the edges 5 and 6 adjacent to an upwardly curved peak 7 of the spoon being in a wavy line and the point of the spoon terminating in a U-shaped contour 8 which is the portion of the spoon first to be inserted in the grapefruit. The edges 5 and 6, including the U-shaped contour 8, as before stated, form a wavy margin which accomplishes the cutting of the grapefruit but the said edge is not sharp, so that any danger of cutting the lip when the grapefruit is being eaten is entirely eliminated. In fact, it is found that the grapefruit is cut in this way very readily though the laterally directed edge is made intentionally very dull. In making the spoon from a stamping of sheet metal, as for example sheet iron or steel, the wavy margin referred to is bevelled throughout along the upper inner margin so that the resulting edge is laterally directed and leaves a cutting edge which is directed outwardly and horizontally substantially parallel to the plane of the upper lip, and which is left in a very dull finished form. It will be noted also that the peak 7 of the spoon projects upwardly, as shown in Fig. 2, above the level of the edges 5 and 6, which enables the last vestiges of the meat of the grapefruit to be removed from the respective segments of the latter. This is aided by reason of the longitudinal curvature 9 of the bottom of the bowl 4 of the spoon leading up to said peak 7, as shown in Fig. 2.

Thus, in using the spoon the grapefruit is served without the meat being cut from the adjacent septa and the grapefruit is eaten preferably by first inserting the U-shaped peak 7 of the spoon into the marginal portion of the meat of the grapefruit and moving the spoon from side to side until the meat of the grapefruit in the particular segment thereof is entirely cut away, after which it is removed to be eaten. When thus removed the channel 3 serves as an additional container for the juice of the grapefruit, which is advantageous because of the exceptional amount of juice being found in this type of fruit. In other words the spoon will not only hold the meat of the grapefruit in the bowl 4 but has the added capacity for the juice present on account of the channel 3 provided in the spoon.

While I have described my invention above in detail I wish it to be understood that many changes may be made therein without departing from the spirit of the same.

I claim:

1. A spoon having a handle, a bowl provided with a wavy edge having waves extending upwardly from the concavity of the bowl and a liquid-retaining channel between the handle and the bowl of the spoon and communicating with the bowl.

2. A spoon having a handle, a bowl provided with a zigzag edge terminating in a U-shaped peak at the outer end of and above the concavity of the bowl and a liquid-retaining channel between the handle and the bowl of the spoon and communicating with the bowl.

3. A spoon having a handle, a bowl provided with a wavy edge having waves extending upwardly from the concavity of the bowl terminating in a U-shaped peak at the outer end of and above the concavity of the bowl and a liquid-retaining channel between the handle and the bowl of the spoon and communicating with the bowl.

4. A spoon having a handle, a bowl provided with a dull zigzag edge terminating in a U-shaped peak at the outer end of and above the concavity of the bowl and a liquid-retaining channel between the handle and the bowl of the spoon and communicating with the bowl.

5. A spoon having a handle, a bowl provided with a dull wavy edge having waves extending upwardly from the concavity of the bowl terminating in a U-shaped peak at the outer end of and above the concavity of the bowl and a liquid-retaining channel between the handle and the bowl of the spoon and communicating with the bowl.

ARTHUR WRIGHT.